United States Patent [19]

Braun et al.

[11] Patent Number: 4,873,065
[45] Date of Patent: Oct. 10, 1989

[54] FLUE GAS PURIFICATION PROCESS

[75] Inventors: Hartmut Braun; Hubert Vogg, both of Karlsruhe, Fed. Rep. of Germany

[73] Assignee: Kernforschungszentrum Karlsruhe GmbH, Karlsruhe, Fed. Rep. of Germany

[21] Appl. No.: 41,293

[22] Filed: Apr. 22, 1987

[30] Foreign Application Priority Data

May 2, 1986 [DE] Fed. Rep. of Germany ....... 3614814

[51] Int. Cl.[4] ...................... B01D 47/05; B01D 47/06
[52] U.S. Cl. ................... 423/210; 210/688; 423/100
[58] Field of Search ............... 210/688; 423/100, 210, 423/240 R, 240 S

[56] References Cited

U.S. PATENT DOCUMENTS

| | | | |
|---|---|---|---|
| 3,583,908 | 8/1971 | | 210/673 |
| 4,152,493 | 5/1979 | Yotsumoto et al. | 210/688 |
| 4,261,819 | 4/1981 | Winter | 210/688 |
| 4,305,827 | 12/1981 | Sasaki | 210/688 |
| 4,332,916 | 6/1982 | Thill | 210/688 |
| 4,617,180 | 10/1986 | Vogg | 423/240 |
| 4,620,492 | 11/1986 | Vogg et al. | 423/243 |
| 4,664,810 | 5/1987 | Matejka et al. | 210/688 |

*Primary Examiner*—Patrick P. Garvin
*Assistant Examiner*—George R. Fourson
*Attorney, Agent, or Firm*—Spencer & Frank

[57] ABSTRACT

Improved flue gas purification process features a heavy metal separating process, such as an anion exchange process, in which a scrubbing condensate is treated to remove at least the Hg contained therein prior to extracting the flue ash, which was previously separated and collected, with the scrubbing condensate to extract soluble heavy metals therefrom. A further heavy metal separating process, such as a cation exchange process, in which the scrubbing condensate after the extraction step is treated to remove at least one of Cd and Zn contained therein is also featured and may be performed after the extraction step or after solid/liquid separation of the flue ash and condensate from the extraction step.

14 Claims, 1 Drawing Sheet

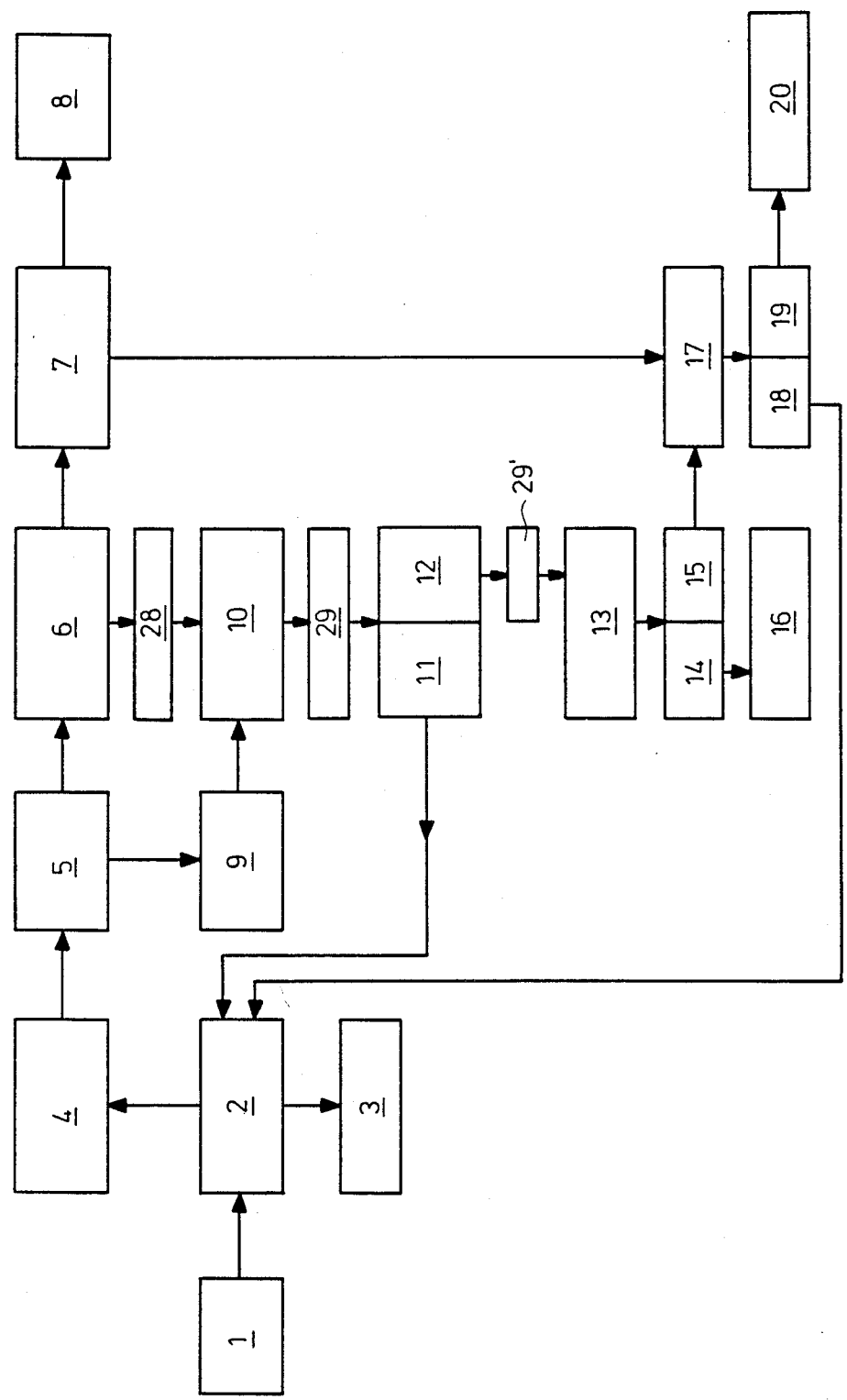

FLUE GAS PURIFICATION PROCESS

BACKGROUND OF THE INVENTION

1. Field of the Invention

The present invention relates to a process for purifying flue gases developed during the incineration of waste materials and containing contaminants including solids of varied compositions, as well as gaseous contaminants, including pollutant gases and heavy metals in gaseous form, wherein flue ash is collected, the flue gas is scrubbed for the purpose of condensing the gaseous contaminants and removing the remaining solids, and the resulting condensate is used to extract soluble heavy metals out of the flue ash. Such a process is disclosed in FRG-OS 3,320,466 and counterpart U.S. Pat. No. 4,617,180, the disclosure of which is herein incorporated by reference.

2. Background of the Art

During flue gas purification, solid, liquid and/or gaseous contaminants are separated from the flue gas with the aim of reducing damage to the environment to an acceptable degree. Contaminant dusts can be separated from flue gas by mechanical and electrical processes, such as passing the flue gas through fabric filters or electrostatic filters, as well as by chemical processes, such as wet dust removal processes employing one or more of an absorption, adsorption, and chemisorption principle. Contaminant gases can be separated from the flue gas by processes including one or more of an absorption, adsorption, condensation, and chemical reaction process. Wet scrubbing processes produce sludges, slurries containing dissolved salts, and waste water, the majority of which generally are not toxic and therefore make decontamination of special refuse unnecessarily expensive and uneconomical.

Flue gas purification systems often combine several of these basic processes into a total process. One of the most common refuse incineration processes provides, at the flue gas end, the purification of the flue gas by removing dust in a filter system including electrostatic or woven filters, and partial removal of the contaminant gases HCl, $SO_2$, and HF in the flue gas by means of acid or alkali treatment methods upstream or downstream of the filter system. Such a process is described in *Abfallwirtschaft an der TU Berlin* [Waste Management at the Technical University of Berlin], Volume 7, pages 1–41.

In the past, heavy metals present in gaseous form, e.g., Hg vapor, or organic contaminants, e.g. chlorinated dioxins, have been primarily removed by wet processes downstream of the filters. The removal of heavy metal contaminants, however, has been unreliable and/or inadequate to ensure that the ecosystem is adequately protected, particularly over long-term exposure. High priority problems still remain to be solved with respect to the heavy metal contaminants Hg, Cd, Pb, Sb, Sn, and Zn, as well as others contained in the flue ash, the flue gas and/or the slag from the refuse incineration system.

SUMMARY OF THE INVENTION

It is an object of the present invention to improve the above-mentioned flue gas process by separating toxic heavy metals, particularly Hg, Cd and Zn, from the waste waters of the process as specifically as possible, so that salt laden waste waters, freed of heavy metals, may be discharged into a main drainage channel.

It is a further object of the present invention to improve the above-mentioned flue gas purification process by separating toxic heavy metals, particularly Hg, Cd, and Zn, from the waste waters of the process as specifically as possible and in a concentrated form, so that the highly specific concentrates are available for reprocessing and recycling.

These and other objects are accomplished in a process for purifying flue gas generated by the combustion of waste materials, the flue gas being comprised of solid particulates, polluting gases including HCl, heavy metal vapors including Hg vapor, and water vapor, the process including the steps of separating the majority of solid particulates from the flue gas in a dry solids separation system and collecting the solid particulates as flue ash; scrubbing from the flue gas the solid particulates remaining in the flue gas leaving the dry solids separation system and condensing polluting gases, heavy metal vapors, and water vapor from the flue gas leaving the dry solids separation system in a condensation/scrubbing system to form a condensate; and extracting soluble heavy metals from the flue ash with the condensate to produce a purified flue ash, the improvement according to a first embodiment being subjecting the condensate from the scrubbing step to a first heavy metal separating process which selectively removes at least Hg from the condensate prior to the extracting step.

The first heavy metal separating process according to the invention may be an anion exchange process to which the condensate from the scrubbing step may be subjected. The present invention additionally contemplates subjecting the condensate after the extraction step or after a separation step to a second heavy metal separating process which may be a cation exchange process.

These and other objects are likewise accomplished in a process for purifying flue gas generated by the combustion of waste materials, the flue gas being comprised of solid particulates, polluting gases including HCl, heavy metal vapors of Hg, Cd, and Zn, and water vapor, the process including the steps of: separating the majority of solid particulates from the flue gas in a dry solids separation system and collecting the solid particulates as flue ash; scrubbing from the flue gas the solid particulates remaining in the flue gas leaving the dry solids separation system and condensing polluting gases, heavy metal vapors, and water vapor from the flue gas leaving the dry solids separation system in a condensation/scrubbing system to form a condensate; and extracting soluble heavy metals from the flue ash with the condensate to produce a purified flue ash, the improvement according to a second embodiment being subjecting the condensate from the extracting step to a heavy metal separating process which selectively removes at least one of Cd and Zn from the condensate.

These and other objects are also accomplished in a process for purifying flue gas generated by the combustion of waste materials, the flue gas being comprised of solid particulates, polluting gases including gaseous HCl, $SO_2$, and $NO_x$, heavy metal vapors including Hg vapor, and water vapor, the process including the steps of: separating the majority of solid particulates from the flue gas in a dry solids separation system and collecting same as flue ash; scrubbing from the flue gas the solid particulates remaining in the flue gas leaving the dry solids separation system and condensing polluting gases, heavy metal vapors and water vapor from the flue gas leaving the dry solids separation system in a condensation/scrubbing system to form an acidic condensate (preferably an acidic condensate having a pH of 4 or less); washing the scrubbed flue gas with an alkali wash solution to further remove polluting gases including $SO_2$ and $NO_x$ and thereby provide a flue gas purified of combustion waste materials; extracting soluble heavy metals (preferably at least 37.2 percent by weight of soluble heavy metals) from the flue ash with the acidic condensate to produce a purified flue ash; separating the purified flue ash from the acidic condensate in a first solid/liquid separation system; precipitating the soluble heavy metals contained in the acidic condensate after the first separating step by reaction thereof with a precipitation agent; separating the precipitated heavy metals from the acidic condensate in a second solid-liquid separation system; and neutralizing the acidic condensate from the precipitating step by combining it with the alkali wash solution from the washing step, the improvement according to a third embodiment being subjecting the condensate from the scrubbing step to a first heavy metal separating process which selectively removes at least Hg from the acidic condensate prior to the extraction step.

The heavy metal separating process according to the invention in combination with the previously mentioned prior art flue gas purification processes is directed toward protecting the environment. Gaseous contaminants, such as HCl, $SO_2$, $NO_x$, as well as metals in gaseous form, such as, Hg, and soluble heavy metal contaminants present in the flue dust and in the slag of the incineration system are eliminated. Preferably the heavy metal contaminants are eliminated in such a manner that only immobile, i.e., insoluble, unleachable, components remain which may be combined with the incineration slag in such a manner that long-term storage and, thus, unobjectionable reuse or decontamination, respectively, are ensured.

The improved process according to the invention also employs wet chemical flue gas purification processes, however, these processes are structured to operate with minimum water consumption, to meet municipal and/or industrial requirements for purification of the flue gas, such as by neutralizing residual acidic gaseous contaminants, for example, $SO_2$ and $NO_x$, after the condensation/scrubbing step in an alkaline wash step, and to extract contaminant components from the flue ash without contaminating the flue ash.

For the selective separation of the heavy metals mercury, cadmium and zinc, the invention employs ion exchange processes as the preferred separation processes. Since mercury and, under certain conditions, cadmium readily form chloride complexes and are present as such in the condensate from the flue gas condensation/scrubbing step, it is possible to effectively use, for example, highly basic, selective anion exchangers employing anion-type exchange resins for the separation of at least these heavy metals. Selective cation exchangers employing cation-type exchange resins may be then used to selectively separate at least zinc and, under certain conditions, cadmium. In order to meet municipal requirements for discharge of liquids into a main drainage channel, the separation should reduce the heavy metal content of waste water to levels not exceeding, for example, 0.05 mg Hg/l or 0.1 mg Cd/l.

BRIEF DESCRIPTION OF THE DRAWING

The invention may be better understood by referring to the detailed description of the invention when taken in conjunction with the accompanying drawing which is a block flow diagram of the process according to the invention.

DESCRIPTION OF THE PREFERRED EMBODIMENTS

The invention will now be described in greater detail with reference to embodiments which are illustrated in the drawing.

According to the block flow diagram, refuse 1 is introduced into an incineration system 2 and is incinerated. This produces heat, flue gas, as well as slag 3. Part of the heat is extracted from the flue gas by passing the flue gas through a heat exchange system 4 and is available for other uses. Care is taken that the temperature does not fall below the dew point. After this heat recovery, the flue gas, which contains solid particulates of various compositions, polluting gases including HCl, $SO_2$, $NO_x$, heavy metal vapors, such as Hg, Cd, and Zn vapors, and water vapor, is selectively subjected to dry preliminary purification in a dry solids separation system 5, such as a cyclone or an electrostatic filter, at about 180° C., to remove solid particulates which are then collected as flue ash 9. Care is taken that the temperature does not fall below the dew point for any of the components of the flue gas, such as water vapor or the like.

The dry purification process is followed by a condensation/washing process to condense vapors, such as HCl and Hg, and to remove any remaining particulates from the flue gas. The gases, vapors, and remaining particulates leaving the dry solids separation system 5 are subjected to scrubbing by a liquid, such as water, in a condensation/scrubbing system 6. A condensate remains, which is an acid condensate having a pH less than 5, typically a pH of 4 or less, and which contains the condensed vapors of, for example HCl, and heavy metals. The scrubbed flue gas generally continues to contain the contaminant components $SO_2$ and $NO_x$ and is then subjected to an alkaline wash 7 to provide a purified flue gas. The purified flue gas is conducted to a chimney 8 and is discharged into the atmosphere.

According to the invention, the condensate from the condensation/scrubbing system 6 is subjected to a first heavy metal separation process 28 for the purpose of selectively separating, i.e., removing, at least the Hg. This may be done with excellent results by means of an anion exchanger, e.g. a "Lewatit TP 204" made by Bayer, which contains a non-regenerative anion-type exchange resin. The capacity for mercury of this non-regenerative resin was determined to be about 200 g Hg/l. Thus, for example, with a mercury concentration in the condensate, i.e., the flue gas wash water, of about 5 mg Hg/l, one liter of anion exchange resin is able to purify 40 m³ of condensate. The separation is preferably, but not necessarily, effected before extraction of the flue dust 9 with the condensate, since otherwise mercury contained in the condensate would attach itself to the flue dust.

The condensate from the heavy metal separating process 28, is combined with the flue ash 9 in a solution reactor 10 in order to extract soluble heavy metals out of flue ash 9. Extraction using Hg-free condensate according to the invention is more efficient and is preferred, however, extraction may be conducted using the condensate from the condensation/ scrubbing system 6 and the heavy metal separation process according to the invention may be practiced downstream of the solution reactor 10. A mechanical mixing means may be provided. The condensate generally contains HCl, is generally acidic, and reacts with the flue ash, which is generally alkaline, during the extraction. A final pH of about 3 typically results.

Next, a solid-liquid separation system, such as a sedimentation or centrifuging apparatus, is employed to separate the extraction mixture into a solid residue 11 and a solution 12. Solution 12 is essentially composed of condensate containing the soluble heavy metals removed from flue ash 9. The solid residue 11 may be advantageously returned to the incineration system 2 where it is bound into slag 3 at a high temperature.

The present invention further provides a second heavy metal separating process 29 in which at least Cd and/or Zn are selectively separated, i.e., removed, from the condensate, either immediately after extraction of the flue dust 9 and before the solid-liquid separation (second heavy metal separating process 29), or after the solid/liquid separation and before heavy metal precipitation 13 (second heavy metal separating process 29'). This may be done with excellent results by means of a cation exchanger, e.g., a "Lewatit TP 207" made by Bayer, which contains a cation-type exchange resin. At least Cd and/or Zn are removed without simultaneously removing calcium salts from the condensate, which salts are generally present in large quantities.

The Hg, Cd and/or Zn free condensate is then subjected to heavy metal precipitation 13, which is preferably a sulfide precipitation 13 in which a sulfide is put in contact with the condensate. A further solid-liquid separation system, such as a sedimentation or centrifuging apparatus, may be employed to separate the precipitation mixture into a solid residue 14 and a solution 15. Heavy metals are present in compact form in solid residue 14 and are available for recycling 16. Solution 15 is generally still acidic and may be combined with the alkaline wash liquid from alkaline wash 7 for the purpose of neutralization in neutralization system 17. A clarification sludge 18 and a solution 19 may be recovered by allowing the neutralization mixture to settle.

The clarification sludge 18 formed during neutralization is preferably returned to the incineration system 2 where it is bound into slag 3 at high temperatures. Alternately, clarification sludge 18 and solution 19 may be mixed and the suspension may be discharged into a main drainage channel 20.

The present invention includes an embodiment in which the first heavy metal separating process 28 for at least Hg is not utilized. Instead, Cd and/or Zn are removed from the condensate in either second heavy metal separating process 29 or 29' and the Hg as well as other heavy metals, are precipitated during heavy metal precipitation 13.

The present disclosure relates to the subject matter disclosed in Federal Republic of Germany, P 36 14 814.8, filed May 2, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a process for purifying flue gas generated by the combustion of waste materials, the flue gas being comprised of solid particulates, polluting gases including HCl, heavy metal vapors including Hg, and water vapor, the process including the steps of:
    a. separating the majority of solid particulates from the flue gas in a dry solids separation system and collecting the solid particulates as flue ash;
    b. scrubbing from the flue gas the solid particulates remaining in the flue gas leaving the dry solids separation system and condensing polluting gases, heavy metal vapors, and water vapor from the flue gas leaving the dry solids separation system in a condensation/scrubbing system to form a condensate; and
    c. extracting soluble heavy metals from the flue ash with the condensate to produce a purified flue ash, the improvement comprising:
    subjecting the condensate from the scrubbing step to a first heavy metal separating process which is an ion exchange process and which selectively removes at least Hg from the condensate prior to the extracting step.

2. The process according to claim 1, wherein the first heavy metal separating process is an anion exchange process.

3. The process according to claim 1, wherein the first heavy metal separating process is a cation exchange process.

4. The process according to claim 1, wherein the heavy metal vapors additionally include Cd vapor and Zn vapor, the process comprising the further step of subjecting the condensate from the extracting step to a second heavy metal separating process which is an ion exchange process and which selectively removes at least one of Cd and Zn from the condensate.

5. The process according to claim 4, wherein the second heavy metal separating process is a cation exchange process.

6. The process according to claim 1, wherein the heavy metal vapors additionally include Cd vapor and Zn vapor, the process comprising the further steps of separating the purified flue ash from the condensate in a solid/liquid separating system, and subjecting the condensate from the separating step to a second heavy metal separating process which is an ion exchange process and which selectively removes at least one of Cd and Zn from the condensate.

7. The process according to claim 6, wherein the second heavy metal separating process is a cation exchange process.

8. In a process for purifying flue gas generated by the combustion of waste materials, the flue gas being comprised of solid particulates, polluting gases including gaseous HCl, $SO_2$, and $NO_x$, heavy metal vapors including Hg vapor, and water vapor, the process including the steps of:
    a. separating the majority of solid particulates from the flue gas in a dry solids separation system and collecting the solid particulates as flue ash;
    b. scrubbing from the flue gas the solid particulates remaining in the flue gas leaving the dry solids separation system and condensing polluting gases, heavy metal vapors and water vapor from the flue gas leaving the dry solids separation system in a condensation/scrubbing system to form an acidic condensate;

c. washing the scrubbing flue gas with an alkali wash solution to further remove polluting gases including $SO_2$ and $NO_x$ and thereby provide a flue gas purified of combustion waste materials;

d. extracting soluble heavy metals from the flue ash with the acidic condensate to produce a purified flue ash;

e. separating the purified flue ash from the acidic condensate in a first solid/liquid separation system;

f. precipitating the soluble heavy metals contained in the acidic condensate after the first separating step by reaction thereof with a precipitation agent;

g. separating the precipitated heavy metals from the acidic condensate in a second solid-liquid separation system; and h. neutralizing the acidic condensate from the precipitating step by combining it with the alkali wash solution from the washing step, the improvement comprising:

subjecting the condensate from the scrubbing step to a first heavy metal separating process which is an ion exchange process and which selectively removes at least Hg from the acidic condensate prior to the extraction step.

9. The process according to claim 8, wherein the first heavy metal separating process is an anion exchange process.

10. The process according to claim 8, wherein the heavy metal vapors additionally include Cd vapor and Zn vapor, the process comprising the further step of subjecting the acidic condensate from the extracting step to a second heavy metal separating process which is an ion exchange process and which selectively removes at least one of Cd and Zn from the condensate prior to the first separating step.

11. The process according to claim 10, wherein the second heavy metal separating process is a cation exchange process.

12. The process according to claim 8, wherein the heavy metal vapors additionally include Cd vapor and Zn vapor, the process comprising the further step of subjecting the acidic condensate from the first separating step to a second heavy metal separating process which is an ion exchange process and which selectively removes at least one of Cd and Zn from the acidic condensate after the first separating step.

13. The process according to claim 12, wherein the second heavy metal separating process is a cation exchange process.

14. The process according to claim 8, wherein the precipitation agent is a sulfide.

* * * * *